United States Patent [19]
Clemons

[11] Patent Number: 5,898,552
[45] Date of Patent: Apr. 27, 1999

[54] MAGNETIC DISK CARTRIDGE HAVING STRIP LINERS

[75] Inventor: Gregory Ray Clemons, Dothan, Ala.

[73] Assignees: Sony Corporation, Tokyo, Japan; Sony Electronics, Inc., Park Ridge, N.J.

[21] Appl. No.: 08/691,365

[22] Filed: Aug. 2, 1996

[51] Int. Cl.$^6$ ................................................ G11B 23/03
[52] U.S. Cl. ............................................................ 360/133
[58] Field of Search ................................. 360/133, 135, 360/137

[56] References Cited

U.S. PATENT DOCUMENTS

| | | | |
|---|---|---|---|
| 4,626,949 | 12/1986 | Brock et al. | 360/133 |
| 4,658,318 | 4/1987 | Bauck et al. | 360/133 |
| 4,839,765 | 6/1989 | Lam | 360/133 |
| 4,969,061 | 11/1990 | Patterson et al. | 360/133 |
| 5,327,314 | 7/1994 | Clemons | 360/133 |

FOREIGN PATENT DOCUMENTS

| | | | |
|---|---|---|---|
| 58-56265 | 4/1983 | Japan | 360/133 |
| 61-230692 | 10/1986 | Japan | 360/133 |

OTHER PUBLICATIONS

IBM Technical Disclosure Bulletin vol. 19, No. 12; Bothun; "Encased . . . Magnetic Disc With Wiper", May 1977.

*Primary Examiner*—Jefferson Evans
*Attorney, Agent, or Firm*—Ronald P. Kananen

[57] ABSTRACT

A magnetic disk cartridge having a plurality of generally rectangular-shaped strip liners placed in sliding contact with a magnetic recording sheet to protect and clean the sheet. The strip liners are provided in pairs on each side of the magnetic recording sheet, each pair having first and second strip liners disposed on opposite sides of a central axis of the magnetic recording sheet. The strip liners for a 3.5 inch floppy magnetic disk cartridge have a length of approximately 4 to 5 cm and a width of approximately 1.6 to 2 cm. The strip liners are formed of a nonwoven fabric and are thermally welded to an inside surface of the upper and lower casings within a circumference of the magnetic recording material. The strip liners reduce manufacturing costs over conventional disk-shaped liners, and also provide a significant improvement in quality.

14 Claims, 4 Drawing Sheets

MAGNETIC DISK CARTRIDGE HAVING STRIP LINERS

BACKGROUND OF THE INVENTION

1. Field of the Invention

This invention relates generally to magnetic disk cartridges in which a disc-shaped, thin magnetic recording medium, namely a magnetic disc sheet, is rotatably supported. More particularly, the invention relates to a magnetic disc cartridge in which a liner is placed in sliding contact with the magnetic disc sheet to protect and clean the sheet.

2. Description of the Related Art

Magnetic disk sheets, i.e., floppy disks, are widely used as recording media for computers because they are easy to handle and low in cost. A conventional magnetic disk sheet comprises a disk-like base sheet made of flexible polyester or the like, and magnetic material layers overlaid on opposite surfaces of the disk-like base sheet. The magnetic disk sheet is rotated for magnetically recording information on the magnetic material layers by use of a magnetic head.

In general, writing of information on the magnetic disk sheet or reading of information therefrom is carried out by rotating a magnetic disk sheet and, at the same time, sliding a magnetic writing head or a magnetic reading head over the magnetic recording surface in the radial direction of the magnetic disk sheet. Therefore, when conformity of the surface of the magnetic disk sheet with the magnetic head is low, or when dust or the like enters the gap of the magnetic head in the course of writing or reading of the information, the signal input and/or signal output fluctuates, or drop-outs occur. Such fluctuations or drop-outs are serious because magnetic disk cartridges are used mainly as digital data memories in computers or the like and a single data error may be unacceptable.

Referring to FIG. 1, a conventional 3.5-inch type small magnetic disk cartridge 10 will be described. The cartridge 10 includes an outer case formed of an upper casing 11, a lower casing 12, and a dust-preventing shutter 13. The shutter 13 covers openings 14 and 15 in the casings 11 and 12, respectively, and has an opening 13a to permit access to a recording surface of a magnetic disk sheet 16 by a magnetic recording head. A hub 16a is fixed to the magnetic disk sheet 16 for rotatably driving the disk sheet 16 with a disk drive mechanism.

Disk-like liners 17 and 18 formed of a rayon nonwoven fabric, a polyester nonwoven fabric or the like are disposed between the magnetic disk sheet 16 and an inner wall surface of the upper and lower casings 11 and 12, respectively. The liners 17 and 18 lightly contact the upper and lower recording surfaces of the magnetic disk sheet 16, respectively. A lifter spring 19 is attached to the lower casing 12 to exert pressure against the liner 18 to maintain contact between the liners 17 and 18 and the recording surface. When the magnetic disk sheet 16 is rotated, the liners 17 and 18 function to remove dust or the like from the surface of the magnetic disk sheet 16.

As mentioned above, liners formed of rayon, polyester or the like have heretofore generally been shaped in a disk-like form. This disk-like shape requires a significant amount of material for the liner, and also results in a large amount of material being wasted during the manufacturing process. For example, several disk-shaped liners may be cut from a single sheet of liner material. A disk-shaped liner will require an amount of material, both used and wasted, having a surface area equivalent to a square with sides equal to a diameter of the liner. Thus, a conventional disk liner having a diameter of 8.6 cm requires approximately 74 cm$^2$ (8.6 cm×8.6 cm) of liner material to manufacture. This large amount of liner material is a significant cost in high volume disk cartridge production. Moreover, conventional disk-shaped liners require a large amount of thermal welding to secure the liners to the plastic casings.

In addition, the large amount of textile liner material within the disk cartridge has a tendency to create what is referred to as "soft error." Soft error results from textile particles from the liners being leaked to the media of the rotating magnetic disk sheet. Such soft error is primarily caused by the ultrasonic welding of the upper and lower plastic casings 11 and 12 together during manufacture. The ultrasonic welding utilizes a high frequency vibration, which tends to break the liner material down and cause the material to be leaked to the media. The soft error will generally correct itself after the disk rotates a sufficient number of times so that the leaked particles of liner material are reabsorbed by the liners. However, if the recording head contacts the disk sheet while a large amount of liner material is in the media, permanent damage to the media can result.

Accordingly, there is a need for an improved liner for floppy disk cartridges to reduce the occurrence of soft error and to minimize manufacturing costs.

SUMMARY OF THE INVENTION

An object of the present invention is to solve the problems associated with the conventional liners for floppy disk cartridges, as described above.

More specifically, it is an object of the present invention to provide an improved liner for a floppy disk that minimizes manufacturing cost and reduces the occurrence of soft error.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a magnetic disk cartridge according to the present invention comprises a case having an upper casing and a lower casing, a planar circular-shaped magnetic recording material rotatably disposed between the upper and lower casings, and a pair of strip liners secured to one of the upper and lower casings. The strip liners are disposed on opposite sides of a central axis of the magnetic recording material and in wiping engagement with a first surface of the magnetic recording material.

The strip liners each preferably have a generally rectangular shape with a length of approximately 4 to 5 cm and a width of approximately 1.6 to 2 cm for a 3.5 inch floppy magnetic disk cartridge. An elongate opening is formed in the upper and lower casings to permit access of the magnetic recording material by a magnetic recording head, and a longitudinal dimension of the strip liners extends generally parallel to a longitudinal dimension of the elongate opening. The strip liners are formed of a nonwoven fabric and are thermally welded to an inside surface of the upper and lower casings. The strip liners are preferably disposed within a circumference of the magnetic recording material.

In accordance with another aspect of the present invention, a magnetic disk cartridge according to the present invention comprises a case having an upper casing and a lower casing, a planar circular-shaped magnetic recording material rotatably disposed between the upper and lower casings, a first pair of strip liners secured to the upper casing, and a second pair of strip liners secured to the lower casing, each pair of the strip liners comprising a first strip liner disposed on a first side of a central axis of the magnetic recording material and a second strip liner disposed on a second side of the central axis. The strip liners are each disposed in wiping engagement with a respective recording surface of the magnetic recording material.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE PREFERRED EMBODIMENT

Figure 3:
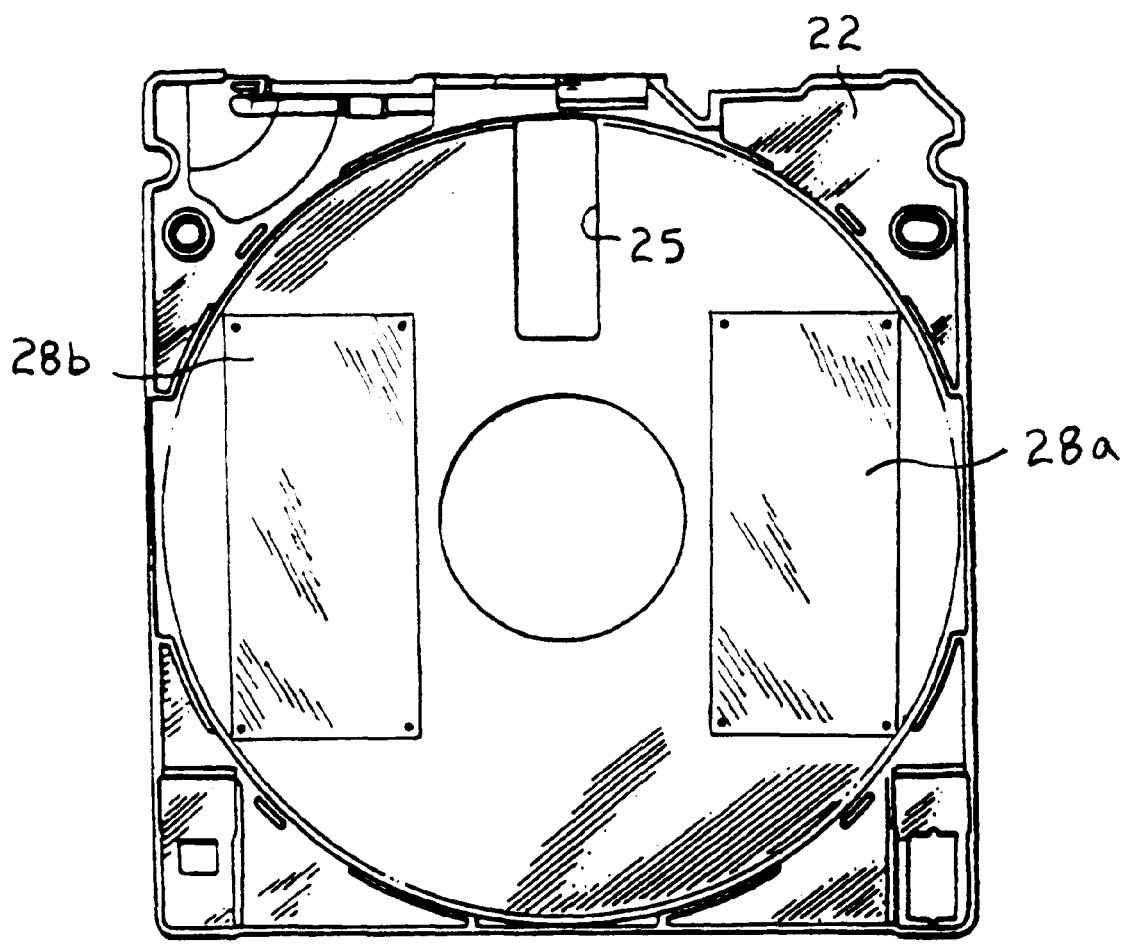
FIG. 3 is a plan view of a bottom casing of the magnetic recording disk cartridge shown in FIG. 2.
Figure 4:
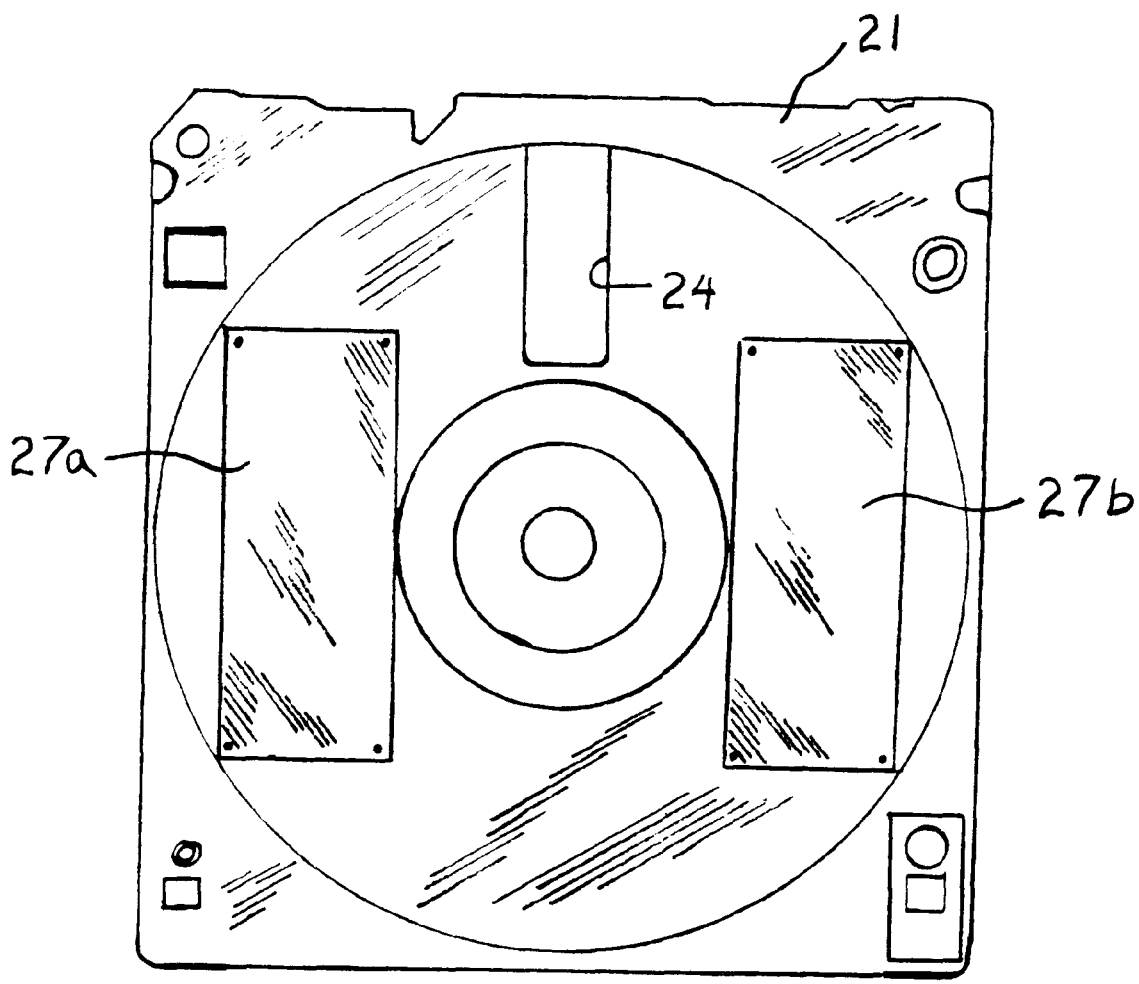
FIG. 4 is a plan view of a top casing of the magnetic recording disk cartridge shown in FIG. 2.

A preferred embodiment of the present invention will be described in detail hereinafter with reference to FIGS. 2 to 4.

Figure 1:
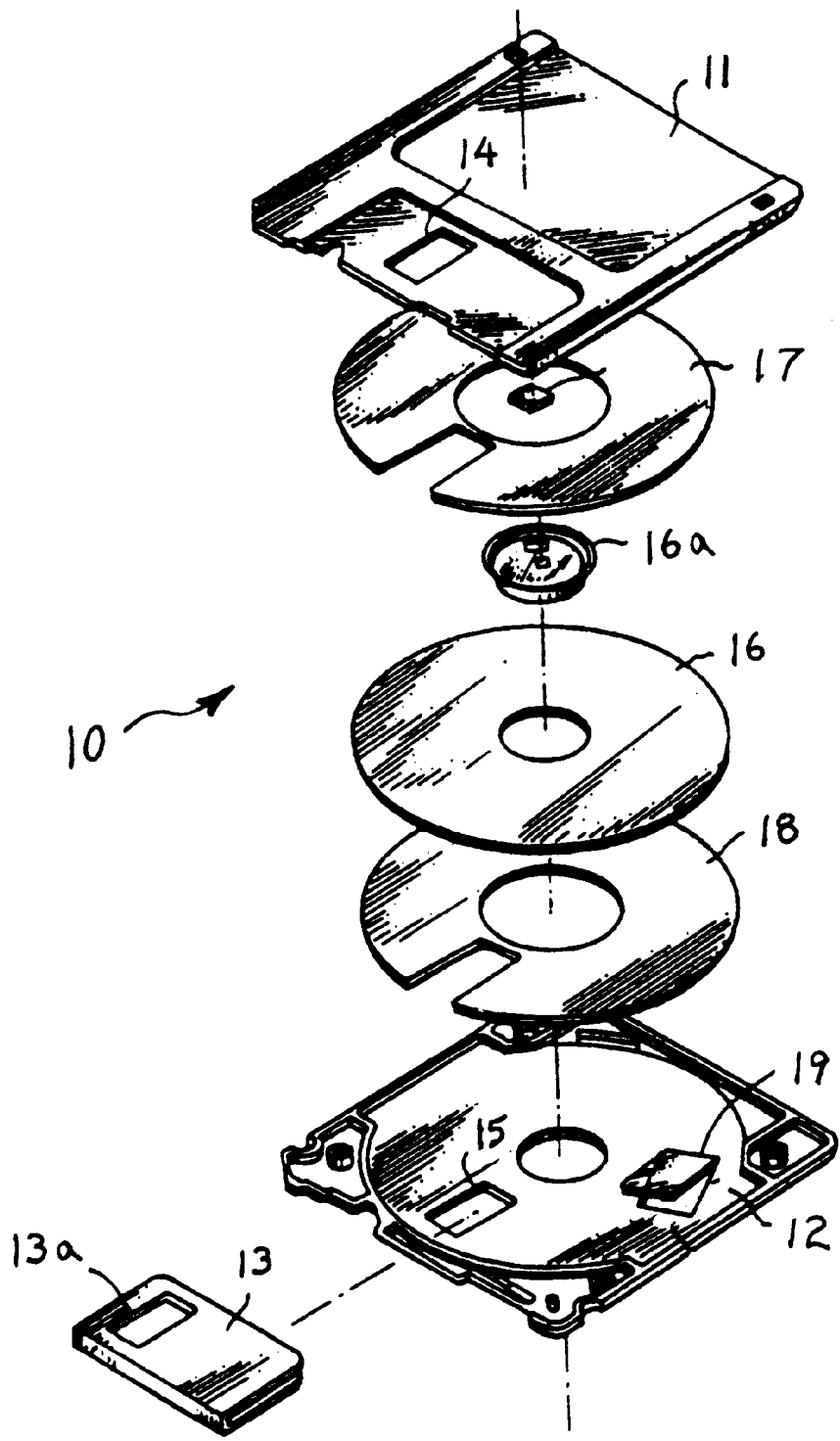
FIG. 1 is an exploded perspective view of a conventional magnetic recording disk cartridge.
Figure 2:
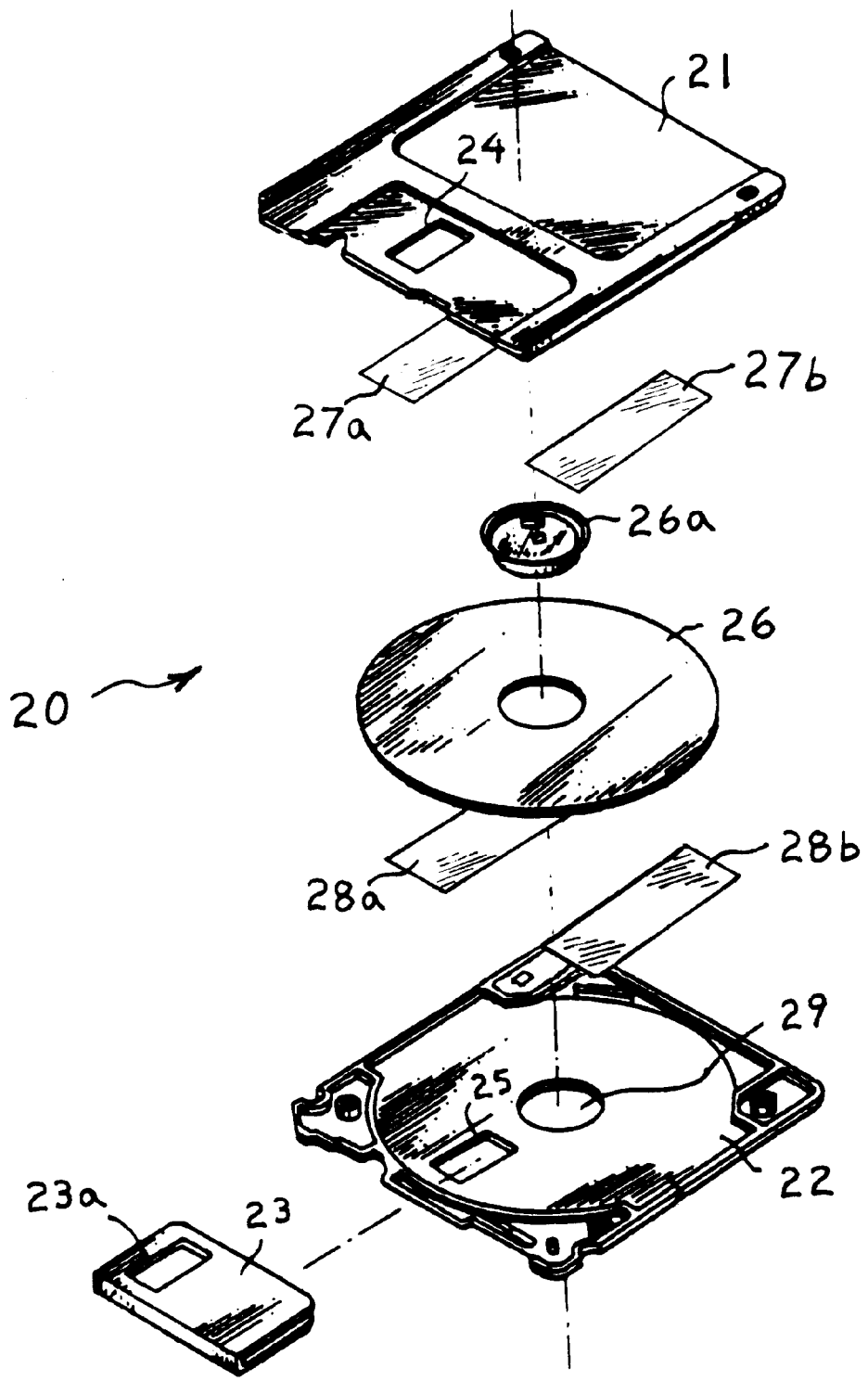
FIG. 2 is an exploded perspective view of a magnetic recording disk cartridge with strip liners according to the present invention.

Referring to FIG. 2, a 3.5-inch type small magnetic disk cartridge 20 according to the present invention will be described. The cartridge 20 includes an outer case formed of an upper casing 21, a lower casing 22, and a dust-preventing shutter 23. The shutter 23 covers elongated openings 24 and 25 in the casings 21 and 22, respectively, and has an opening 23a to permit access to a recording surface of a magnetic disk sheet 26 by a magnetic recording head. A hub 26a is fixed to the disk sheet 26 and provides a means for rotatably driving the disk sheet 26 with a disk drive mechanism.

Rectangular-shaped strip liners 27a, 27b, 28a, and 28b are disposed between the magnetic disk sheet 26 and the inner wall surfaces of the upper and lower casings 21 and 22, respectively. The strip liners 27a, 27b, 28a, and 28b are formed of a rayon nonwoven fabric, a polyester nonwoven fabric or other suitable nonwoven fabric material. The corners of the strip liners 27a, 27b, 28a, and 28b are thermally welded to the inner wall surfaces of the plastic casings 21 and 22. Thermal welds may also be provided along the side edges of the strip liners.

In a preferred embodiment, the strip liners have a length of approximately 4 to 5 cm and a width of approximately 1.6 to 2 cm. The strip liners 27a, 27b, 28a, and 28b are fastened to the casings 21 and 22 with a lengthwise dimension of the liners extending in a direction generally parallel with a longitudinal dimension of the openings 24 and 25 in the casings 21 and 22. As shown in FIGS. 3 and 4, the liners are disposed on opposite sides of a central axis of the magnetic disk sheet and within a circumference of the magnetic disk sheet.

In operation, the strip liners 27a, 27b, 28a, and 28b lightly contact the upper and lower recording surfaces of the magnetic disk sheet 26, respectively. When the magnetic disk sheet 26 is rotated, the strip liners 27a, 27b, 28a, and 28b remove dust or the like from the surface of the magnetic disk sheet 26. The dimensions of the strip liners provide a surface area that results in an effective wiping action and, at the same time, generates a suitable resistance or torque on the disk sheet 26 without the need for a separate lifter spring. Moreover, the rectangular shape of the strip liners 27a, 27b, 28a, 28b permit manufacture of the strip liners from a large sheet of liner material with virtually no wasted material.

The reduced surface area of liner material that results with the strip liners 27a, 27b, 28a, 28b also generates less debris than the conventional disk-shaped liners during ultrasonic bonding of the cartridge casing. The reduced debris generated by the liner material reduces the occurrence of soft error and thereby provides a significant improvement in quality.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A magnetic disk cartridge comprising:
    a case having an upper casing and a lower casing;
    a planar, circular-shaped magnetic recording material rotatable disposed between said upper and lower casings; and
    a pair of strip liners secured to one of said upper and lower casings, said strip liners being disposed on opposite sides of a central axis of said magnetic recording material and in wiping engagement with a first surface of said magnetic recording material, wherein said strip liners are disposed within a circumference of said magnetic recording material.

2. The magnetic disk cartridge according to claim 1, wherein said strip liners each have a generally rectangular shape.

3. The magnetic disk cartridge according to claim 2, wherein said disk cartridge has a width of approximately 3.5 inches, and wherein said strip liners each have a length of approximately 4 to 5 cm and a width of approximately 1.6 to 2 cm.

4. The magnetic disk cartridge according to claim 2, further comprising an elongate opening formed in said one of said upper and lower casings to permit access of said magnetic recording material by a magnetic recording head, said strip liners each having a longitudinal dimension extending generally parallel to a longitudinal dimension of said elongate opening.

5. The magnetic disk cartridge according to claim 1, further comprising a second pair of strip liners secured to the other one of said upper and lower casings, said second pair of strip liners being disposed on opposite sides of said central axis of said magnetic recording material and in wiping engagement with a second surface of said magnetic recording material.

6. The magnetic disk cartridge according to claim 1, wherein said strip liners are formed of a nonwoven fabric.

7. The magnetic disk cartridge according to claim 1, wherein said strip liners are thermally welded to an inside surface of said one of said upper and lower casings.

8. A magnetic disk cartridge comprising:
    a case having an upper casing and a lower casing;
    a planar, circular-shaped magnetic recording material rotatably disposed between said upper and lower casings; and
    a first pair of strip liners secured to said upper casing and a second pair of strip liners secured to said lower casing, each pair of said strip liners comprising a first strip liner disposed on a first side of a central axis of said magnetic recording material and a second strip liner disposed on a second side of said central axis, said strip liners each being disposed in wiping engagement with a respective recording surface of said magnetic recording material, wherein said strip liners are disposed within a circumference of said magnetic recording material.

9. The magnetic disk cartridge according to claim 8, wherein said strip liners each have a generally rectangular shape.

10. The magnetic disk cartridge according to claim 9, further comprising an elongate opening formed in each of said upper and lower casings to permit access of said magnetic recording material by a magnetic recording head, said strip liners each having a longitudinal dimension extending generally parallel to a longitudinal dimension of said elongate opening.

11. The magnetic disk cartridge according to claim 8, wherein said strip liners are formed of a nonwoven fabric.

12. The magnetic disk cartridge according to claim 8, wherein said strip liners are thermally welded to respective inside surfaces of said upper and lower casings.

13. A magnetic disk cartridge comprising:

a case having an upper casing and a lower casing;

a planar, circular-shaped magnetic recording material rotatably disposed between said upper and lower casings; and a pair of strip liners secured to one of said upper and lower casings, said strip liners being disposed on opposite sides of a central axis of said magnetic recording material and in wiping engagement with a first surface of said magnetic recording material, wherein said disk cartridge has a width of approximately 3.5 inches, and wherein said strip liners each have a length of approximately 4 to 5 cm and a width of approximately 1.6 to 2 cm.

14. A magnetic disk cartridge comprising:

a case having an upper casing and a lower casing;

a planar, circular-shaped magnetic recording material rotatably disposed between said upper and lower casings; and a first pair of strip liners secured to said upper casing and a second pair of strip liners secured to said lower casing, each pair of said strip liners comprising a first strip liner disposed on a first side of a central axis of said magnetic recording material and a second strip liner disposed on a second side of said central axis, said strip liners each being disposed in wiping engagement with a respective recording surface of said magnetic recording material, wherein said disk cartridge has a width of approximately 3.5 inches, and wherein said strip liners each have a length of approximately 4 to 5 cm and a width of approximately 1.6 to 2 cm.

* * * * *